United States Patent
Karlin et al.

(10) Patent No.: US 12,033,672 B1
(45) Date of Patent: *Jul. 9, 2024

(54) METHODS AND SYSTEMS FOR GENERATING INTERACTIVE COMPOSITE MEDIA ASSETS COMPRISING COMMON OBJECTS

(71) Applicant: EmergeX, LLC, Cumberland, MD (US)

(72) Inventors: Michael Joseph Karlin, Bethesda, MD (US); Roy Feinson, Washington, DC (US)

(73) Assignee: EmergeX, LLC, Cumberland, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/531,151

(22) Filed: Dec. 6, 2023

Related U.S. Application Data

(63) Continuation of application No. 17/582,979, filed on Jan. 24, 2022.

(60) Provisional application No. 63/141,171, filed on Jan. 25, 2021.

(51) Int. Cl.
| | |
|---|---|
| *G11B 27/34* | (2006.01) |
| *G06F 16/435* | (2019.01) |
| *G06F 16/487* | (2019.01) |
| *G06T 3/60* | (2006.01) |
| *G06T 5/50* | (2006.01) |
| *G06T 5/70* | (2024.01) |
| *G06T 5/77* | (2024.01) |
| *G06T 7/66* | (2017.01) |
| *G06T 7/73* | (2017.01) |
| *G11B 27/036* | (2006.01) |

(52) U.S. Cl.
CPC ............ *G11B 27/34* (2013.01); *G06F 16/435* (2019.01); *G06F 16/487* (2019.01); *G06T 3/60* (2013.01); *G06T 5/50* (2013.01); *G06T 5/70* (2024.01); *G06T 5/77* (2024.01); *G06T 7/66* (2017.01); *G06T 7/74* (2017.01); *G11B 27/036* (2013.01); *G06T 2200/24* (2013.01); *G06T 2207/10016* (2013.01); *G06T 2207/20092* (2013.01); *G06T 2207/20221* (2013.01); *G06T 2207/30244* (2013.01)

(58) Field of Classification Search
CPC ..... G11B 27/34; G11B 27/036; G06F 16/435; G06F 16/487; G06T 3/60; G06T 5/50; G06T 5/70; G06T 5/77; G06T 7/66; G06T 7/74; G06T 2200/24; G06T 2207/10016; G06T 2207/20092; G06T 2207/20221; G06T 2207/30244
See application file for complete search history.

(56) References Cited

U.S. PATENT DOCUMENTS

2017/0178687 A1* 6/2017 Tamir .................. G11B 27/036

* cited by examiner

*Primary Examiner* — Girumsew Wendmagegn

(74) *Attorney, Agent, or Firm* — Foley & Lardner LLP

(57) ABSTRACT

Methods and systems are disclosed herein to address the problems discussed above and in particular to provide coordination for uncoordinated content. Beyond simply archiving and/or organizing available content, the methods and systems generate composite media assets that provide enriched details and supplemental data that extends beyond any given source content. The methods and systems achieve this through a novel data filtration and synchronization process.

20 Claims, 14 Drawing Sheets

METHODS AND SYSTEMS FOR GENERATING INTERACTIVE COMPOSITE MEDIA ASSETS COMPRISING COMMON OBJECTS

CROSS-REFERENCE TO RELATED APPLICATIONS

This application is a continuation of U.S. patent application Ser. No. 17/582,979, filed Jan. 24, 2022, which claims the benefit of priority of U.S. Provisional Application No. 63/141,171, filed Jan. 25, 2021. The content of the foregoing applications is incorporated herein in its entirety by reference.

BACKGROUND

The increase in use and availability, particularly in mobile devices, of user equipment that may include a content capture device (e.g., a camera, video recorder, microphone, and/or other device with audio, video, or data recording functionality) has risen exponentially in recent years. The plethora of these content capture devices has led to video, audio, and/or other types of recordings being available from many different devices for a given public event.

These content capture devices may be used for numerous reasons such as security, vanity, memorializing events, live streaming, etc., but have nonetheless led to an "Internet of Eyes" environment. While common examples may include a plurality of video recordings captured by respective mobile devices, data may be obtained in the form of images, videos, 2D, 3D, 4D, 6D 360, LiDAR, radar, thermal renderings, MRI scans, CAT scans, ultrasonic, infrared and visual point clouds, or other forms. With content capture devices abundant, there are endless amounts of images and personal videos ("PVs") being captured. However, though many content capture devices are taking PVs, this content is captured in an uncoordinated fashion. Devices are taking PVs without the knowledge or cooperation of other PVs. Subsequently, there are endless numbers of PVs with similar subject matter that remain forever separate. For example, at a given rock concert there may be thousands of people taking videos on their smartphones. Each video contains unique aspects of the concert such as angle, image quality, zoom, direction, focus, etc. Despite the fact that all these people are at the same event, these videos remain separate.

SUMMARY

Methods and systems are disclosed herein to address the problems discussed above and in particular to provide coordination for uncoordinated content. Beyond simply archiving and/or organizing available content, the methods and systems generate composite media assets that provide enriched details and supplemental data that extends beyond any given source content. The methods and systems achieve this through a novel data filtration and synchronization process.

For example, in conventional systems, content about a given event may be archived together based on a particular data attribute (e.g., date, author, etc.). That is, conventional databases relying on tagging individual content with one or more attributes and allowing users to search for that content. While such conventional systems provide efficient navigation and access to groups of content, the result of such conventional systems is at best access to the original content. The methods and systems described herein go beyond simply providing access to original source content and instead generate new content that is greater (e.g., include more content, detail, interactivity, etc.) than any source content.

As one example, the methods and systems generate composite content based on source content (e.g., individual PVs generated by a plurality of remote content capture devices). The composite content may seamlessly synchronize source content (e.g., each of which may include unique aspects of a given event such as angle, image quality, zoom, direction, focus, etc.) into a single composite content that includes an aggregation of the various aspects. Furthermore, as opposed to relying on advance data editing and manual production to create the composite content, the methods and systems achieve this creation automatically. While in some embodiments, the automatic generation is aided through the use of artificial intelligence, the methods and systems nonetheless achieve this through the novel data filtration and synchronization process.

To perform the data filtration process, the system relies on the use of specific types of data, specific processing techniques for those types of data, and a specific processing order of that data. For example, the system distinguishes between certain data characteristics (e.g., a location), which may be immutable (e.g., as the characteristic is determined based on an absolute GPS coordinates), and certain characteristics (e.g., a time), which may not be immutable (e.g., as the characteristic may be vary based on different time/date settings). The system then subjects these different types of data to different data filtration techniques (e.g., absolute vs. ranged or windowed filtration) based on the data characteristics. By doing so, the system creates a serial data filtration process that ensures the pool of content available for use in generating the composite content relates to the same event (e.g., corresponding to a single place and within a given time window), but is not overly narrowing. The system may allow users to select this event through a user selection that indicates a center-of-mass point for a shared geographic location at a shared time window.

Not only does the data filtration process create a pool of assets that reliably relate to the same event, but the aforementioned data filtration process provides a key pre-processing step for the data synchronization step. For example, relying on different content generated using different content capture devices may cause frame jittering because different content capture devices may have slightly different time codes (e.g., even a ½ frame offset may cause visual clutter). However, in most instances objects appearing in content may be visually smoothed without adversely affecting the composite content (e.g., minor details relating to a given event may be smoothed out to reduce visual clutter). By performing an initial data filtration process based on place and time, the system ensures a high likelihood of similar objects appearing in available source content.

The system may use the unforeseen consequence to perform the data synchronization process based on object recognition. For example, to synchronize the subset of assets, the system may now rely on a different data characteristic (e.g., a data characteristic relating to what was captured as opposed to when and where the content was captured). Specifically, the system may now rely on analyzing the subset of assets using object recognition to identify objects in the subset of assets that indicates an object orientation. For example, while a system could rely on location data (e.g., GPS coordinates or a comparison of previous GPS coordinates to determine a trajectory) to determine a direction faced by a content capture device when the content was captured, location data is unlikely to have the high precision necessary for generating composite content. Accordingly, the system relies on yet another type of data. Notably, the use of object recognition on a pool of available content in this manner would conventionally present an onerous processing and resource burden; however, as the data synchronization is performed following the data filtration process, the amount of data to be processed is lower, and the likelihood of detection of key landmarks and object details in the subset of assets (thus leading to a more efficient use of resources) is higher.

Finally, the system may use the data filtration and synchronization process to generate the composite content by merging source content according to the objects therein. The system may generate the composite content based on selected center-of-mass point for a shared geographic location at a shared time window to create a surround video experience of an event.

In one aspect, methods and systems are disclosed for coordinating uncoordinated content based on multi-modal metadata through data filtration and synchronization. For example, the system may receive a first user input requesting a composite media asset based on a center-of-mass point for a shared geographic location at a shared time window. The system may determine a shared object orientation based on the center-of-mass point for the shared geographic location. The system may retrieve a first media asset data structure for a first media asset, wherein the first media asset data structure comprises first location information, first time information, and first object information. The system may retrieve a second media asset data structure for a second media asset, wherein the second media asset data structure comprises second location information, second time information, and second object information. The system may determine that the first media asset and the second media asset correspond to the shared geographic location based on analyzing the first location information and the second location information. The system may, in response to determining that the first media asset and the second media asset correspond to the shared geographic location, determine that the first media asset and the second media asset correspond to the shared time window based on analyzing the first time information and the second time information. The system may, in response to determining that the first media asset and the second media asset correspond to the shared time window, determine that the first media asset and the second media asset correspond to the shared object orientation based on analyzing the first object information and the second object information. The system may, in response to determining that the first media asset and the second media asset correspond to the shared object orientation, generate the composite media asset based on the first media asset and the second media asset by merging the first media asset and the second media asset about the center-of-mass point.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE DRAWINGS

Figure 1A:
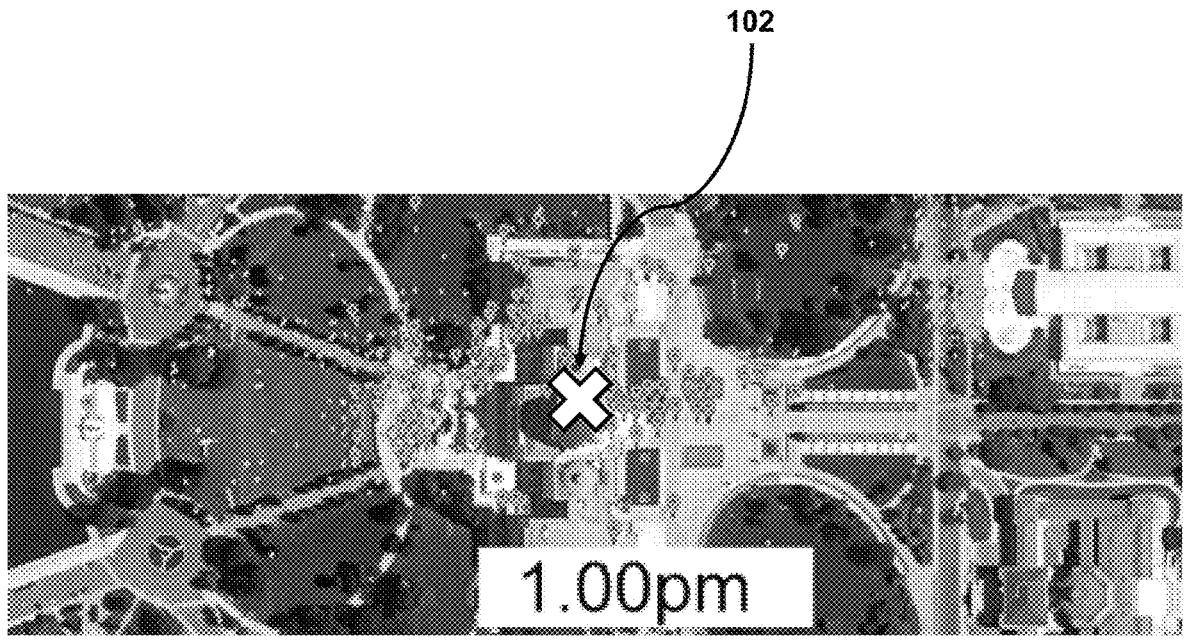
FIGS. 1A-E shows a series of diagrams illustrating the selection of a center-of-mass point for a shared geographic location at a shared time window to create a surround video experience of an event, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

As described herein, a system may facilitate synthesizing disparate media assets or content (e.g., any captured images, videos, or other recordings) and creating a novel visual experience through a composite media asset. For example, the system may integrate multiple media assets to give viewers the ability to interactively view the event from many different angles, and viewers are able to "fly" through the crowd and examine the scene from virtually any perspective. It should be noted that, although some embodiments are described herein with respect to videos, other forms of visual recordings may be used in lieu of or in addition to videos.

In some embodiments, media assets from participating users—or crowd sourced videos—will be downloaded (e.g., to a central cloud server system) and temporally (from time codes in the videos) and geographically (e.g., via GPS coordinates or other geographic location data) synchronized. In some embodiments, an application (e.g., a mobile app) may alert users (e.g., via the users' respective client devices) to position their content capture devices or locations to optimize the angles of the various cameras or fill in gaps. As an example, the system may provide instructions to respective mobile apps on the users' client devices to present one or more visual indicators to direct the users to position their cameras or locations to capture one or more views (e.g., from different angles or positions of a current scene) that the current collection of time or geographically synchronized videos.

For example, a content capture device may incorporate and/or have access to a Global Positioning System ("GPS") module or component for determining the position of a content capture device. For example, an accelerometer, compass, gyroscope, etc. incorporated into a content capture device may indicate the current geographic location and/or direction that a content capture device faces. Additionally or alternatively, the content capture device may incorporate and/or have access to one or more devices or modules capable of detecting motion and/or sensing orientation.

In some embodiments, an end result of the processed videos will be a single interactive "video" (or a three or more dimensional simulated space) that simulates a single camera moving through the scene under user control. As compared to prior systems that use still photographs to create a model of a static structure, one or more embodiments described herein may produce a full-motion, temporarily synchronized 3D reproduction of an event (e.g., a Presidential inauguration where the user may position a virtual camera almost anywhere in the event).

In some embodiments, because footage will emanate from a wide range of cameras, lenses, focal lengths, frame rates, resolutions, lighting settings and geographic displacements, footage may be preprocessed to mitigate these variances. Synchronization issues may cause frame jittering because different cameras will have slightly different time codes (e.g., even a ½ frame offset may cause visual clutter). In some embodiments, one or more prediction model may be used to address such issues. As an example, the system may mitigate such issues by using 3D convolutional neural networks to fill in the gaps (e.g., inbetweening), video frame interpolation via adaptive separable convolution, or other deep learning techniques.

In some embodiments, the movement of the camera will be under user control using a playback mechanism that allows viewers to create a unique experience of the event; either streaming from a cloud server, or from video stored on their local device, configured to allow a user to view a multi-stream video from a selected angle/direction with respect to the contents of the multi-stream video, under the user's control. The user may dynamically change the selection of an image stream, and thus the viewing angle.

In some embodiments, gaps created by the geographic spatial separation of the cameras may be "filled" in a number of different ways using deep-learning methodologies that create novel footage. In some embodiments, in situations when the AI determines that gaps are not adequately "fillable" (e.g., when the architecture of adjoining scenes differ too widely), the footage may be cut or dissolved, or cloud-like artifacts may be added to the footage.

In some embodiments, the system will allow users to edit and arrange the raw footage manually—either individually or collaboratively. In some embodiments, users may choose to record their unique playback experience to share with others.

In some embodiments, the system may enable the user to "walk" into a scene and view it from any angle he chooses (e.g., via the stimulated space described herein or other stimulations). In some embodiments, because many aspects of a scene will be blocked from view—even when multiple cameras are employed—some embodiments may use one or more prior (or future) frames to reconstruct all elements of a particular frame (e.g., via Temporal Data Seeking). For example, if ten cameras are recording a child's birthday party and one child is wearing a shirt with distinctive writing on the back, and the viewer wishes to place the virtual camera from behind the child to view his shirt. Since all cameras are blocked from this view at a particular point in the video, the AI may use previous or later frames (e.g., prior or subsequent in time to the frame) to render the missing portion of the frame. If no previous frames support this effort, the AI will employ its best prediction as to what the back of the child would look like (e.g., including versions without the writing), based on the child's body shape, shirt, hair color, or other features.

In some embodiments, pre-filming of a scene may be performed to supply additional information to one or more prediction models. Because the efficiency of the AI conversion of the videos may be dependent on the acquisition of data, prior recordings of a scene may be obtained and provided to the prediction models. As an example, one or more users may film around the location of a birthday party before the event to supply background and contextual information for a Temporal Data Seeking algorithm, which then builds a database of objects in the scene for later retrieval and insertion into an interactive video or simulated space.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

Figure 1B:
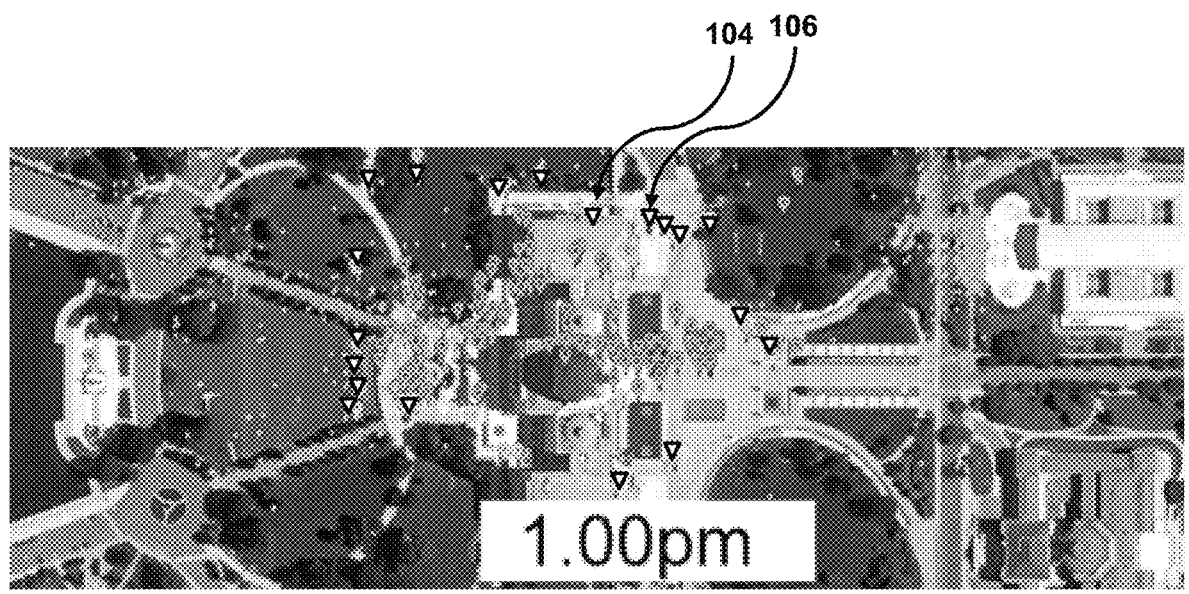

FIGS. 1A-E shows a series of diagrams illustrating the selection of a center-of-mass point for a shared geographic location at a shared time window to create a surround video experience of an event, in accordance with one or more embodiments. For example, as shown in FIG. 1A, the system may designate a center-of-mass point (e.g., center-of-mass point 102). Alternatively or additionally, this center-of-mass point may be selected by the user. In response, the system may select a plurality of available media assets (e.g., media asset 104 and media asset 106) at the location as shown in FIG. 1B.

As used herein, a "location" refers to the current geographical coordinates. For example, a location may be described as a structure (e.g., including, but not limited to, a public building, a private residence, an office building, a restaurant, movie theatre, a vehicle, a bridge, a museum, a road, a driveway, a sidewalk, etc.), a room or compartment of a structure (e.g., including, but not limited to, a bedroom of an adult, a bedroom of a child, a kitchen, a living room, a bathroom, a garage, or any other designation which may describe a room of a structure), and/or any other physical setting, which may be described by a common designation (e.g., including, but not limited to, a yard, a park, a landmark, whether natural or man-made, a hiking trail, a body of water, a municipality, etc.).

As referred to herein, the terms "media asset" and "content" should be understood to mean an electronically consumable user asset, such as a PV, television programming, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, including formats and data types such as 2D, 3D, 4D, 6D 360, LiDAR, Radar, Thermal, MRI, CAT Scans, mixed reality, extended reality, Ultrasonic, infrared and visual point clouds, or other forms, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As used herein, a "content capture device" refers to a device capable of capturing data (e.g., data describing an event) such as audio/video data. In some embodiments, the content capture device may incorporate one or more components or sensors (e.g., components or sensors capable of capturing image, audio, video, and/or any other type of data). For example, the content capture device may include, but is not limited to, a camera (e.g., capable of capturing images and/or videos) and/or a microphone (e.g., capable capturing sound).

The system may also select the media assets based on an orientation (e.g., of the media assets and/or content capture device) to a center point (e.g., center-of-mass point 102) of a given location. For example, the orientation may be in relation to any object at the location and/or identified in a media asset. That is, the shared orientation may refer to a direction at which a content capture device was pointed (or pointed away from) when a media asset was created and/or the orientation may refer to an object (or set of objects) that appear in a media asset.

The system may also use a best-fit mechanism to determine which media assets (or content capture devices) have a proper shared orientation. For example, the best-fit mechanism may filter the media assets at a location (e.g., media asset 104 and media asset 106) based on whether or not the media assets have a shared object orientation. This shared object orientation may be a result of applying a best-fit mechanism to a center point.

For example, to achieve an augmented reality and/or virtual reality environment in which a composite media asset may successfully be created by merging other media assets, the system may need to determine that the media assets have a shared object orientation. In some embodiments, this may require filtering available media assets for a subset of media assets that create a continuous (or near-continuous) perimeter about the center point. To do so, the system may use various filter criteria that correspond to variable in the best-fit mechanism.

For example, the system may filter the media assets to determine the smallest circle (or other contained shape) about a center point (e.g., center-of-mass point 102). The media assets within this contained shape may then be used to generate a composite media asset. To do so, the system may iteratively search through media asset data structures to determine geographic and temporal information for respective media assets that corresponds to the contained shape.

Figure 1C:
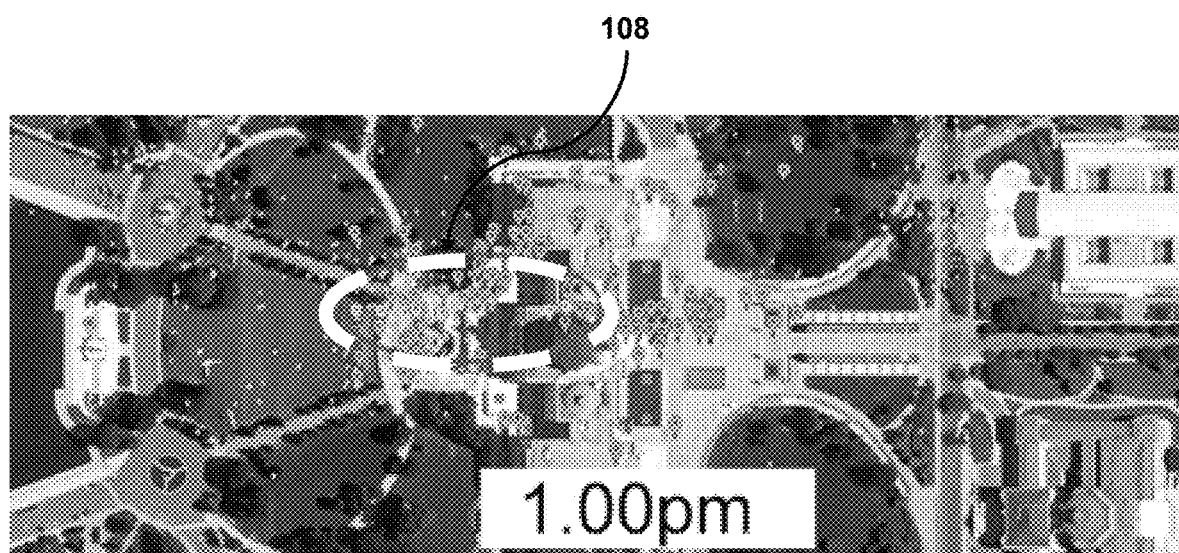
Figure 1D:
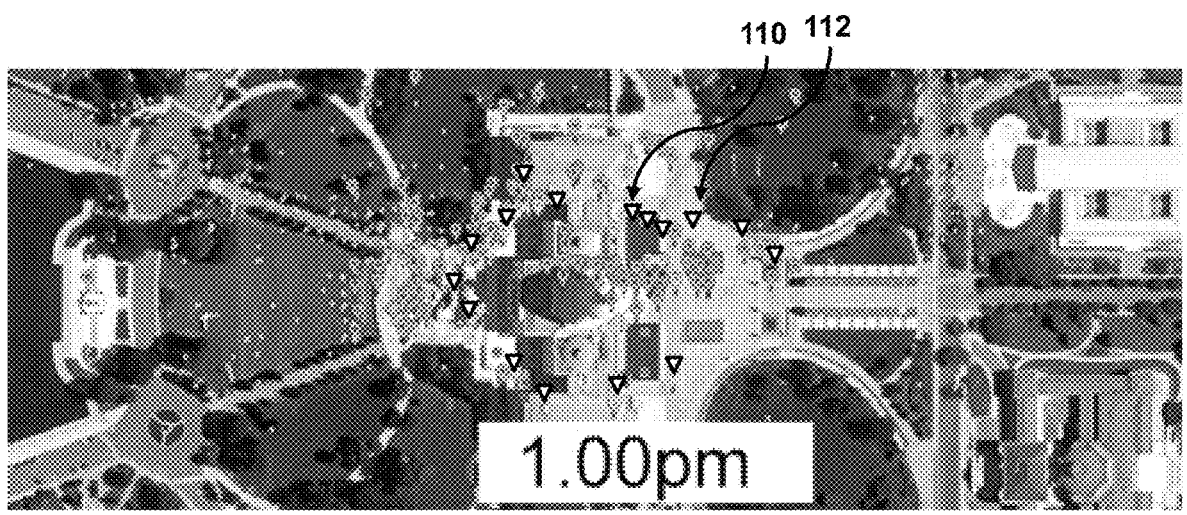

As shown in FIG. 1C, the system may select media assets in an "outer ring" that approximates a circle with the center-of-mass point in the middle (e.g., circle 108) In some embodiments, using one or more playback methods, the system may allow users the option of "scrolling" around this "outer ring" in consecutive clockwise or counter-clockwise directions. At any point while rotating about the circle, the system may receive a user input that elects to "move forward" towards the center-of-mass point. In this case, the system may select a series of media assets—beginning from the media asset last selected—that best represents movement towards the center-of-mass point. For example, as shown in FIG. 1D, the system may allow a user to move left or right on the assigned axis, or the system may allow a user to choose to rotate in a clockwise or counter-clockwise direction beginning from the last-selected media asset on this axis.

In some embodiments, the size and/or placement of circle 108 may be the result of the system using the best-fit mechanism, which may be a curve fitting process in which the available media assets represent a series of data points. The curve fitting process may generate a contained shape (e.g., a circle, polynomial, and/or other shape about a center point) using interpolation or smoothing. For example, in an embodiment using interpolation (e.g., based on a mathematical function applying polynomial interpolation), the system may only select a contained shape in which available media assets meet the curve fit (e.g., align with a curve of the contained shape). In an embodiment using smoothing (e.g., based on a mathematical function applying polynomial regression), the system may only select a contained shape in which available media assets meet the curve fit (e.g., align with a curve of the contained shape) within a threshold. The threshold may in some embodiments be based on an amount of acceptable blurring between media asset images.

During curve fitting, the system may use a best-fit mechanism that finds a curve that minimizes the vertical (y-axis) displacement of a point from the curve (e.g., ordinary least squares). Additionally or alternatively, the system may use a best-fit mechanism that finds a best visual fit (e.g., attempts to minimize the orthogonal distance to the curve (e.g., total least squares), or to otherwise include both axes of displacement of a point from the curve).

Additionally or alternatively, the system may dynamically select new center-of-mass points. For example, the center-of-mass points may shift with movement or time as the availability of media assets changes. The system may then select new media assets based on these changes (e.g., media asset 110 and media asset 112). For example, the system may iteratively and/or continuously search the media asset data structures to determine geographic and temporal information for respective media assets that corresponds to the contained shape based on both the changes to a user's position, but also based on the changes in the available media asset. As such, the system may continuously update the media assets that are used to generate the composite media asset.

Figure 1E:
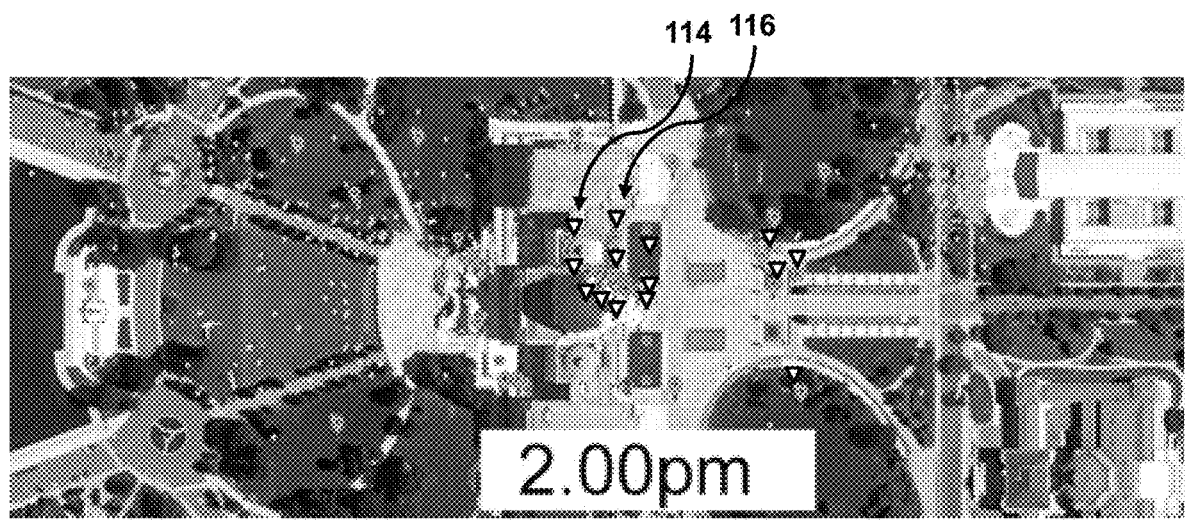

The system may allow a user to select a different time to view the composite media asset at any point such as a new time window as shown in FIG. 1E (e.g., based on media asset 114 and media asset 116). Because the available media assets may dramatically shift over time, the system may update the composite media asset and a user interface indicating available media assets as well as the parameters for the generation of the composite media asset (e.g., an amount of blurring and/or smoothly applied to media assets). For example, as individual media assets end, they are dropped from the database of available media assets and are no longer used to generate center-points, circumference calculations, and/or composite media assets.

In some embodiments, the system may further filter the available media assets based on an acceptable amount of image blurring between media assets to ensure a seamless composite media asset. As such, the system may automatically adjust the contained shaped (e.g., circle 108) based on the available media assets as well as resolution and/or quality determinations (e.g., based on user settings) for the composite media asset. As such, the contained shape may dynamically change in size, shape, orientation, and/or position as a function of user inputs, time, and/or available media assets.

Figure 2A:
FIG. 2A-D shows a series of diagrams illustrating a synchronization of source content for generation of composite content, in accordance with one or more embodiments.
Figure 2B:

FIG. 2A-D shows a series of diagrams illustrating a synchronization of source content for generation of composite content, in accordance with one or more embodiments. For example, as shown FIGS. 2 A-B, the system may automatically align media assets as much as possible. For example, media assets may include content that is created in either vertical or horizontal mode, and the system may convert horizontal modes into vertical modes by selecting the most appropriate portion of the horizontal mode to display using objects or object details (e.g., landmarks or people) as reference points. For example, FIG. 2A shows a frame of a media asset that is vertically filmed, wherein FIG. 2B shows a similar frame (not temporally synched in this example) taken from a different angle and in horizontal mode.

Figure 2C:

The system may use the objects and object details (e.g., the buildings as landmarks) to determine how to rotate, resize, and/or crop the media assets as well as blur and smooth the media assets to generate a composite media asset as shown in FIG. 2C. The resulting composite media asset is relatively evenly matched and makes the scrolling feature more aesthetically pleasing as well as creating a smooth playback experience as shown in FIG. 2D.

Figure 2D:

For example, the smooth objects within media assets as shown in FIG. 2D. For example, in some embodiments, the system may use scale space merging relates to handling image objects at different scales, by representing an image as a one-parameter family of smoothed images, the scale-space representation, parameterized by the size of the smoothing kernel used for suppressing fine-scale structures. For example, the system may then identify an object in the image corresponding to the image set at the optimal level. By using various levels of blur, the objects (e.g., a person in an image) or object details (e.g., a characteristic of an object) may be blurred together into a single object. The system may then detect a single object or object detail (as opposed to two objects or two object details) based on the proximity of the objects to each other.

For example, scale space merging (or filtering) subjects an image to different filtering levels (blurring), then selects one based on certain criteria (e.g., fine versus rough details, noise reduction, selection of important components). For example, when images are blurred, objects that are located near each other will merge into one object.

The system may determine an optimal level of blurring to ensure that the number of objects in media assets corresponds and/or meets a certain threshold. For example, a higher filter (e.g., featuring more blurring) may allow more images to be blurred together with less overall objects, while a lower filter (e.g., featuring less blurring) may allow less images to be seamlessly blurred together, but with more object details. The system may thus detect the optimal amount of blurring using scale space filtering.

To determine the optimal amount of blurring, the system may use segmented linear regression. For example, for image blurring, a Gaussian kernel is used, defined as follows:

$$g(x, y, \sigma) = \frac{1}{2\pi\sigma} e^{-(x+y)2/2\sigma^2}$$

where (x,y) are the image pixel coordinates, and $\sigma$ is the blurring parameter that controls the blurring scale. Upon applying the blurring, the number of identified objects is calculated as a function f of the blurring scale $\sigma$: $N_{objects}=F(\sigma)$.

The number of objects will decrease as a increases. Segmented linear regression may then be used to segment $N_{objects}=F(\sigma)$ into two segments. The breakpoint is detected, and the system provides the optimal blurring scale ($\alpha_{opt}$), and it is used to apply optimal blurring $g(x,y,\sigma_{opt})$ on the two media assets.

In some embodiments, the system may use a content recognition module or algorithm to determine the objects in received data. The content recognition module may use object recognition techniques such as edge detection, pattern recognition, including, but not limited to, self-learning systems (e.g., neural networks), optical character recognition, on-line character recognition (including but not limited to, dynamic character recognition, real-time character recognition, intelligent character recognition), and/or any other suitable technique or method to determine the objects and/or relationship between locations in received data. For example, the system may receive a media asset in the form of a video. The video may include a series of frames. For each frame of the video, the system may use a content recognition module or algorithm to determine the objects in each of the frame or series of frames. In addition, the content recognition module or algorithm may also locate the boundaries of the object and/or detect object details in the frame.

In some embodiments, the content recognition module or algorithm may also include speech recognition techniques, including but not limited to Hidden Markov Models, dynamic time warping, and/or neural networks (as described above) to translate spoken words into text and/or processing audio data. For example, the system may use audio recorded in the media asset to identifying objects and/or may merge audio data. The content recognition module may also combine multiple techniques to determine the objects and/or relationship between objects in received media asset.

In addition, the system may use multiple types of optical character recognition and/or fuzzy logic, for example, when processing keyword(s) retrieved from data (e.g., textual data, translated audio data, user inputs, etc.) associated with a location (or when cross-referencing various types of data in databases indicating the different objects associated with different location types). For example, if the particular data received is textual data, using fuzzy logic, the system (e.g., via a content recognition module or algorithm incorporated into, or accessible by, the media guidance application) may determine two fields and/or values to be identical even though the substance of the data or value (e.g., two different spellings) is not identical. In some embodiments, the system may analyze particular received data of a data structure or media asset frame for particular values or text. The data received could be associated with characteristics, additional information, and/or any other data required for the function of the embodiments described herein. Furthermore, the data could contain values (e.g., the data could be expressed in binary or any other suitable code or programming language).

Figure 3:
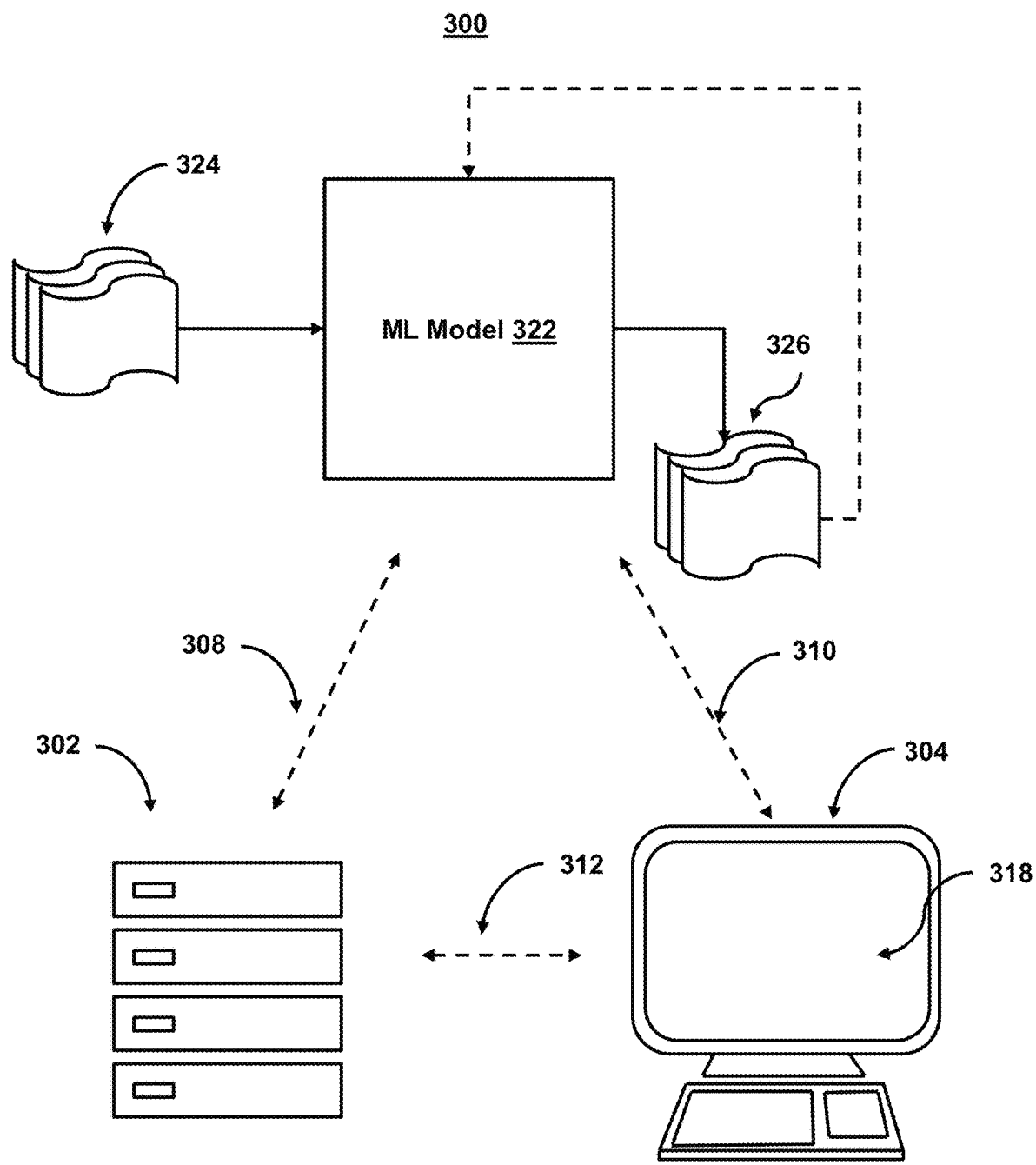
FIG. 3 shows a system featuring an artificial intelligence model configured to identify objects in source content and perform object smoothing when merging content, in accordance with one or more embodiments.

FIG. 3 shows a system featuring an artificial intelligence model configured to identify objects in source content and perform object smoothing when merging content, in accordance with one or more embodiments. As shown in FIG. 3, system 300 may include client device 302, client device 304 or other components. Each of client devices 302 and 304 may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may comprise any suitable processing circuitry. Each of these devices may also include a user input interface and/or display for use in receiving and displaying data. By way of example, client devices 302 and 304 may include a desktop computer, a server, or other client device. Users may, for instance, utilize one or more client devices 302 and 304 to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of client device 302, those operations may, in some embodiments, be performed by components of client device 304. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments). That is, a "machine learning model," "model," and/or "artificial intelligence model" should be taken to include any artificial intelligence model.

Each of these devices may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 3 also includes communication paths 308, 310, and 312. Communication paths 308, 310, and 312 may include the Internet, a mobile phone network, a mobile voice or data network (e.g., a 5G or LTE network), a cable network, a public switched telephone network, or other types of communications network or combinations of communications networks. Communication paths 308, 310, and 312 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

In some embodiments, system 300 may use one or more prediction models used to generate composite content, identify objects, and/or merging content. For example, as shown in FIG. 3, system 300 may detect using machine learning model 322. The determination may be output shown as output 318 on client device 304. The system may include one or more neural networks (e.g., as discussed in relation to FIG. 3) or other machine learning models.

As an example, with respect to FIG. 3, machine learning model 322 may take inputs 324 and provide outputs 326. The inputs may include multiple data sets such as a training data set and a test data set. The data sets may represent images (or image sets) of objects. In one use case, outputs 326 may be fed back to machine learning model 322 as input to train machine learning model 322 (e.g., alone or in conjunction with user indications of the accuracy of outputs 326, labels associated with the inputs, or with other reference feedback information). In another use case, machine learning model 322 may update its configurations (e.g., weights, biases, or other parameters) based on its assessment of its prediction (e.g., outputs 326) and reference feedback information (e.g., user indication of accuracy, reference labels, or other information). In another use case, where machine learning model 322 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 322 may be trained to generate better predictions.

Machine learning model 322 may be trained to identify objects. For example, client device 302 or 304 may identify an object (e.g., via a content capture device), generate a first pixel array based on an image of the object, and label the object (or first pixel array). For example, machine learning model 322 may have classifications for various objects. Machine learning model 322 is then trained based on a first data set (e.g., data of known objects) to classify an unknown object.

The system may then receive a second object. Client device 302 or 304 may generate a second pixel array based on a image of the second object and input the second pixel array into machine learning model 322. The system may then receive an output from machine learning model 322 indicating that the second object is the same as the first (or another object). For example, the system may input a second image into machine learning model 322. Machine learning model 322 may then classify the objects in the second image. For example, a person, a building, object, and/or object detail may be a first classification of machine learning model 322, and the system may generate an output from machine learning model 322 that the second object is the same based on matching the second pixel array to the first classification.

Figure 4:
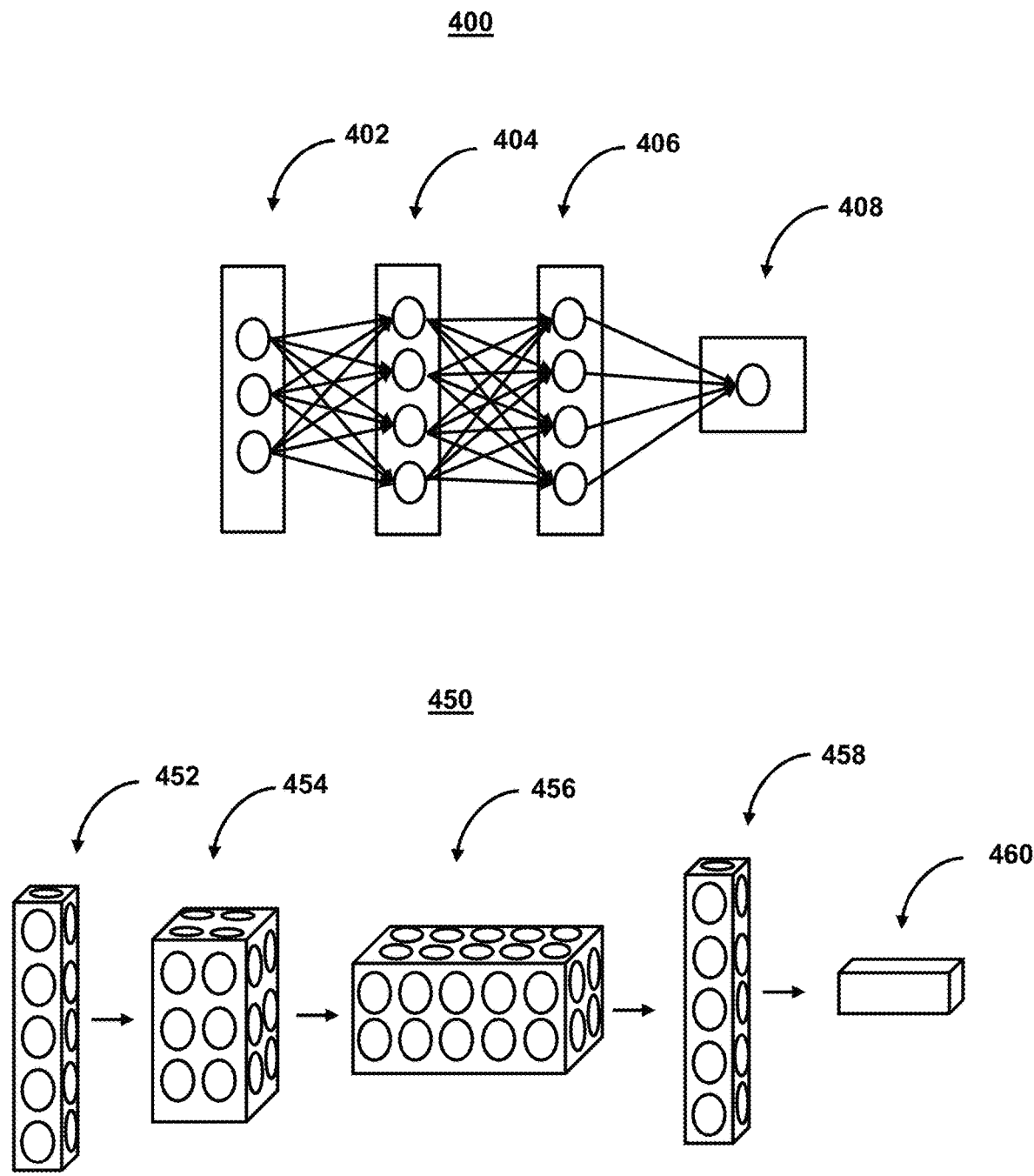
FIG. 4 shows a system featuring an artificial intelligence algorithm used in an artificial intelligence model, in accordance with one or more embodiments.

FIG. 4 shows a system featuring an artificial intelligence algorithm used in an artificial intelligence model, in accordance with one or more embodiments. Model 400 illustrates an artificial neural network. Model 400 includes input layer 402. An image may be entered into model 400 at this level.

Model 400 also includes one or more hidden layers (e.g., hidden layer 404 and hidden layer 406). Model 400 may be based on a large collection of neural units (or artificial neurons). Model 400 loosely mimics the manner in which a biological brain works (e.g., via large clusters of biological neurons connected by axons). Each neural unit of a model 400 may be connected with many other neural units of model 400. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Model 400 may be self-learning and trained, rather than explicitly programmed, and can perform significantly better in certain areas of problem solving, as compared to traditional computer programs. During training, output layer 408 may corresponds to a classification of model 400 (e.g., whether or not a given image corresponds to a particular object) and an input known to correspond to that classification may be input into input layer 402.

In some embodiments, model 400 may include multiple layers (e.g., where a signal path traverses from front layers to back layers). In some embodiments, back propagation techniques may be utilized by model 400 where forward stimulation is used to reset weights on the "front" neural units. In some embodiments, stimulation and inhibition for model 400 may be more free-flowing, with connections interacting in a more chaotic and complex fashion. Model 400 also includes output layer 408. During testing, output layer 408 may indicate whether or not a given input corresponds to a classification of model 400 (e.g., whether or not a given image corresponds to a particular object).

FIG. 4 also includes model 450, which is a convolutional neural network. The convolutional neural network is an artificial neural network that features one or more convolutional layers. Convolution layers extract features from an input image. Convolution preserves the relationship between pixels by learning image features using small squares of input data. For example, the relationship between the individual portions of a image. As shown in model 450, input layer 452 may proceed to convolution blocks 454, 456, and 458 before being output to convolutional output 460. In some embodiments, model 450 may itself serve as an input to model 400.

With respect to applications identifying objects, model 450 may also be adjusted to improve performance. For example, model 450 may undergo weight pruning such that each weight is measure and unimportant weights are removed. Notably, the loss of this data does not affect overall accuracy as information contrast well with portions of data without information. Similarly, sparse convolutional neural networks, in particular submanifold sparse convolutional networks, also perform well in object recognition applications. Maximum sparsity is obtained by exploiting both inter-channel and intra-channel redundancy, with a fine-tuning step that minimize the recognition loss caused by maximizing sparsity. It should also be noted that embodiments discuss herein may also be used with (other/any) deep learning, machine learning or differentiable programming architecture, including CNN-LSTMs, and spiking neural networks designed to work with media assets.

In some embodiments, the system may use Long Short-Term Memory (LSTM) network for object recognition, in accordance with one or more embodiments. For example, after the system has detected and extracted the optimal number of objects or object details, the system may use a LSTM network for object recognition.

For example, the LSTM is an artificial recurrent neural network ("RNN") architecture. The use of the LSTM may provide superior results to other types of RNN architecture. For example, when training other RNN using back-propagation, the gradients which are back-propagated can tend to zero or infinity, because of the computations involved in the process, which use finite-precision numbers. RNNs using LSTM units partially solve the vanishing gradient problem, because LSTM units allow gradients to also flow unchanged.

The system may use a beam search to optimize the raw probabilities by taking into account the conditional probability of an object based on the preceding objects. For example, beam search is a heuristic search algorithm that explores a graph by expanding the most promising node in a limited set. Beam search is an optimization of best-first search that reduces its memory requirement. The system may determine the object details that corresponds to an object and/or digitally recognize the object or object details.

Figure 5:
FIG. 5 shows an illustrative example of a data structure comprising multi-modal data for use in generating composite content, in accordance with one or more embodiments.

FIG. 5 shows an illustrative example of a data structure comprising multi-modal data for use in generating composite content, in accordance with one or more embodiments. Data structure 500 may be generated and/or received by the system with a media asset that is available for use in generating a composite media asset. For example, data structure 500 may relate to an image recorded by a content capture device that is being processed. Data structure 500 may feature the multi-modal metadata, which is received by the system that describes the location, or objects at the location, of the content capture device.

In some embodiments, data structure 500 may be processed by a content recognition module (e.g., incorporated into, or accessible by, the system) to determine objects at the location and/or within the media asset. For example, the system may process data structure 500 to identify particular objects at the location of the user equipment device. The identified objects may then be used to determine merged media assets and/or generate a composite media asset.

Data structure 500 includes several fields of code, which may be used by the system to identify an object. Field 502 indicates to the system the beginning of data in data structure 500 associated with a media asset, and field 526 indicates to the system the end of data in data structure 500 associated with the media asset.

Field 504 indicates the position (or geographic location) at which the image was captured. In some embodiments, the position at which the image was captured may be used by the system to determine whether the media asset corresponds to a shared geographic location. For example, field 504 may describe GPS coordinates for the media asset. In some embodiments, the media guidance application may cross-reference this information with a GPS database to determine additional information about the location, which may indicate a location type (e.g., whether or not the location is indoors, outdoors, in a private residence, in a public building, etc.). In some embodiments, the system may retrieve this information to identify a corresponding data point for a best-fit mechanism.

Additionally or alternatively, the system may use the position information to add an indicator to a map of available media assets (e.g., as shown in FIGS. 1A-E). For example, the system may use this information to generate a mapping, which describes the geographical coordinates of the location relative to other locations.

Field 506 described a time or time window corresponding to the media asset. The time may be generated by an internal clock of the content capture device or may be generated based on a remote time-stamp. Field 508 through field 620 may indicate to the media guidance application information describing the image of the location. For example, field 508 through field 524 may indicate information about one or more objects located in the media asset. For example, field 510 through field 522 may indicate that an object (e.g., a building) was identified in the image of the location. Field 514 indicates the size of the object. Field 516 indicates the shape of the object, and field 518 indicates the position of the object. The information describing the object may be used by the system to identify the object. For example, the system may enter the information included in field 510 through field 520 into a lookup table database or use the information generate a feature input for a machine learning model.

For example, upon matching the object or location in the received data with an object or location in the location database, the system determines the current location of the media asset based on the location name indicated in the location database as corresponding to the matched object or location. Having determined the current location of the user media asset, the system may proceed to select, recommend, and/or transmit one or more media assets corresponding to the particular location.

In some embodiments, operational parameters of a content capture device may also be included in data structure 500. As used herein, "operational parameters" refers to the characteristics and properties associated with the recording capabilities and characteristics of a content capture device. For example, operational parameters may include formats, resolutions, orientations, display qualities, or other features (e.g., 3D display abilities, surround sound audio, screen size limitations, etc.) that the content capture device uses to generate content. For example, the system may use this information to merge media assets. This information may also be used to determine an acceptable amount of blurring and/or whether or not a media asset may be used for a given amount of blurring.

Figure 6:
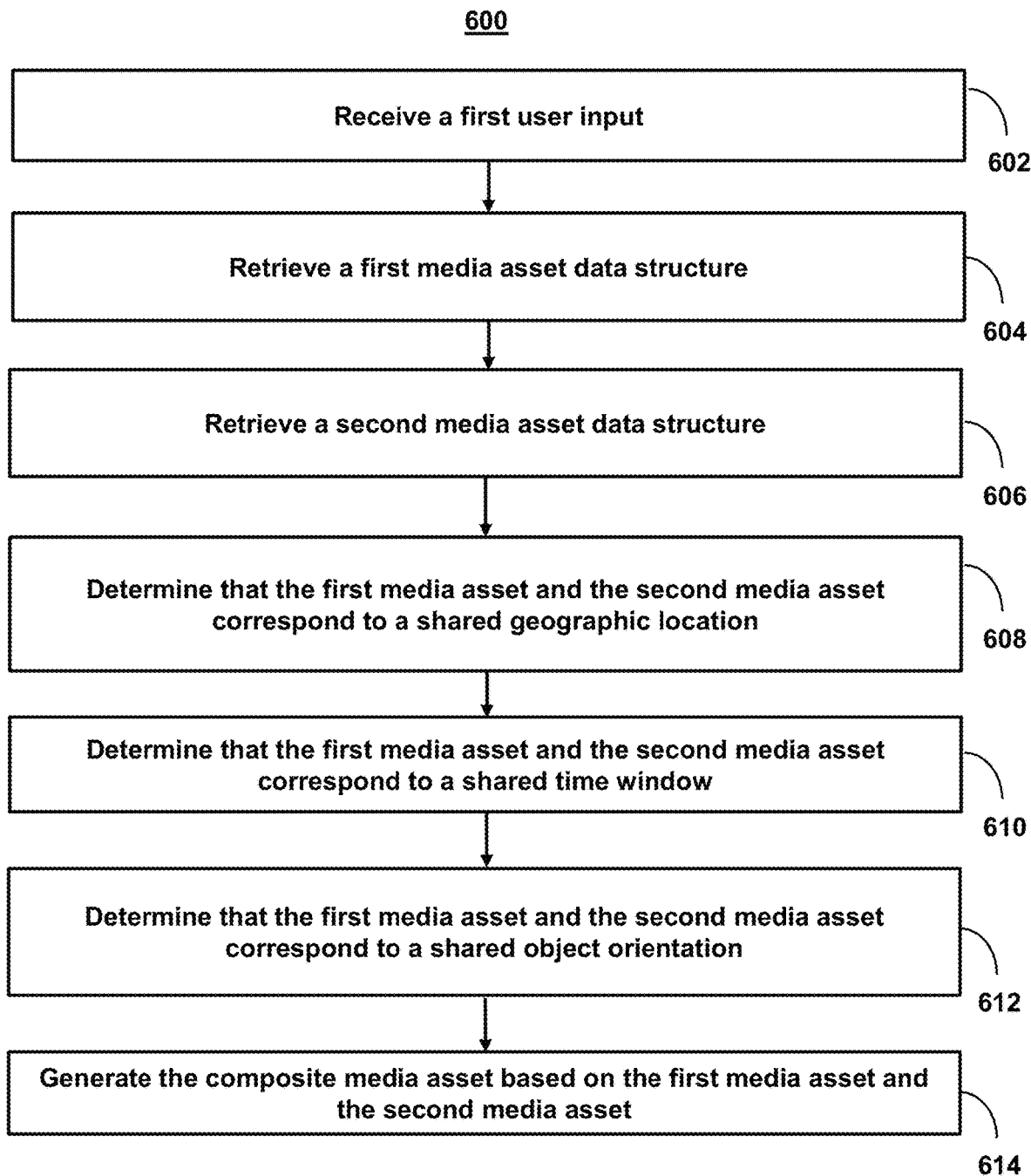
FIG. 6 shows an illustrative flowchart of steps for coordinating uncoordinated content based on multi-modal metadata through data filtration and synchronization in order to generate composite media assets, in accordance with one or more embodiments.

FIG. 6 shows an illustrative flowchart of steps for coordinating uncoordinated content based on multi-modal metadata through data filtration and synchronization in order to generate composite media assets, in accordance with one or more embodiments. Process 600 may be performed using the control circuitry of one or more components described in FIG. 3.

At step 602, process 600 receives (e.g., using the control circuitry of one or more components described in FIG. 3) a first user input. For example, the system may receive a first user input requesting a composite media asset based on a center-of-mass point for a shared geographic location at a shared time window. For example, the system may determine a shared object orientation based on the center-of-mass point for the shared geographic location.

In some embodiments, receiving the first user input requesting the composite media asset based on the center-of-mass point for the shared geographic location at the shared time window comprises: receiving a user selection of an object in the first media asset; determining a geographic location in which the object is found; assigning the geographic location as the shared geographic location; and assigning a position of the object at the geographic location as the center-of-mass point.

At step 604, process 600 retrieves (e.g., using the control circuitry of one or more components described in FIG. 3) a first media asset data structure. For example, the system may retrieve a first media asset data structure for a first media asset, wherein the first media asset data structure comprises first location information, first time information, and first object information. For example, the location information may indicate a geographic location corresponding to the first media asset. The time information may indicate a time corresponding to the first media asset. The object information may indicate an object included with the first media asset.

In some embodiments, each media asset may comprise a plurality of frames and the system may retrieve information about each frame and dynamically merge one or more frames to create a composite media asset. For example, the system may determine a first frame of the plurality of frames for generating the composite media asset. The system may determine a subset of the first media asset data structure that corresponds to the first frame. The system may retrieve the location information, the first time information, and the first object information from the subset of the first media asset data structure.

At step 606, process 600 retrieves (e.g., using the control circuitry of one or more components described in FIG. 3) a second media asset data structure. For example, the system may retrieve a second media asset data structure for a second media asset, wherein the second media asset data structure comprises second location information, second time information, and second object information.

At step 608, process 600 determines (e.g., using the control circuitry of one or more components described in FIG. 3) that the first media asset and the second media asset correspond to a shared geographic location. For example, the system may determine that the first media asset and the second media asset correspond to the shared geographic location based on analyzing the first location information and the second location information.

In some embodiments, determining that the first media asset and the second media asset correspond to the shared geographic location based on analyzing the first location information and the second location information may further comprises receiving a second user input indicating the shared geographic location and, in response to receiving the second user input indicating the shared geographic location, filtering a plurality of available media assets based on a comparison of respective location information for the plurality of available media assets and the shared geographic location to generate a first subset of media assets.

At step 610, process 600 determines (e.g., using the control circuitry of one or more components described in FIG. 3) that the first media asset and the second media asset correspond to a shared time window. For example, the system may, in response to determining that the first media asset and the second media asset correspond to the shared geographic location, determine that the first media asset and the second media asset correspond to the shared time window based on analyzing the first time information and the second time information.

In some embodiments, determining that the first media asset and the second media asset correspond to the shared time window based on analyzing the first time information and the second time information further comprises receiving a third user input indicating the shared time window and, in response to receiving the third user input indicating the shared time window, filtering first subset of media assets based on a comparison of respective time information for the first subset of media assets and the shared time window to generate a second subset of media assets.

At step 612, process 600 determines (e.g., using the control circuitry of one or more components described in FIG. 3) that the first media asset and the second media asset correspond to a shared object orientation. For example, the system may, in response to determining that the first media asset and the second media asset correspond to the shared time window, determine that the first media asset and the second media asset correspond to the shared object orientation based on analyzing the first object information and the second object information.

In some embodiments, determining that the first media asset and the second media asset correspond to the shared object orientation based on analyzing the first object information and the second object information further comprises: identifying a known object corresponding to the center-of-mass point; retrieving a plurality of known object details for the known object at the shared object orientation; and determining a known object detail of the plurality of known object details is in both the first media asset and the second media asset.

At step 614, process 600 generates (e.g., using the control circuitry of one or more components described in FIG. 3) the composite media asset based on the first media asset and the second media asset. For example, the system may, in response to determining that the first media asset and the second media asset correspond to the shared object orientation, generating the composite media asset based on the first media asset and the second media asset by merging the first media asset and the second media asset about the center-of-mass point. For example, the shared object orientation may comprise a direction that a content capture device faced when capturing a respective media asset.

As referred to herein a "direction," as associated with a media asset, refers to a deviation, expressed as an angle, from the course of an imaginary line connecting the current position of a user to true or magnetic north to a course a content capture device was facing when a media asset was captured. For example, if a content capture device was pointed "North" when the content capture device captured a media asset, the direction associated with the media asset would be "North." Likewise, if a content capture device was facing "South" when a frame of a media asset was captured, the frame of the media asset would be associated with a direction of "South."

It should be noted that a direction may also be expressed in any other suitable format. For example, additionally or alternatively, a direction may be expressed as a degree (e.g., in a polar coordinate system). In another example, a direction may be expressed as any one of three angles that a line in space makes with the three positive directions (e.g., from a reference point) of coordinate axes (e.g., usually designated as a, 3, and y with respect to the x-, y-, and z-axes). For example, in some embodiments "directions" associated with media assets and/or content capture device may be associated with coordinates relative to a user and/or one or more fixed points.

In some embodiments, generating the composite media asset based on the first media asset and the second media asset by merging the first media asset and the second media asset further comprises: identifying a shared object in both the first media asset and the second media asset; and generating a representation of the shared object in the composite media asset using a first object detail from the first media asset and a second object detail from the second media asset, wherein the second media asset does not comprise the first object detail and the first media asset does not comprise the second object detail.

In some embodiments, generating the composite media asset based on the first media asset and the second media asset by merging the first media asset and the second media asset about the center-of-mass point further comprises: identifying a first portion of the first media asset corresponding to an out-of-focus object; selecting a second portion of the second media asset corresponding to the out-of-focus object in the first media asset; and replacing the first portion of the first media asset with the second portion. For example, the system may identify blurry areas an replace those areas.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed above could be used to perform one or more of the steps in FIG. 6.

Figure 7:
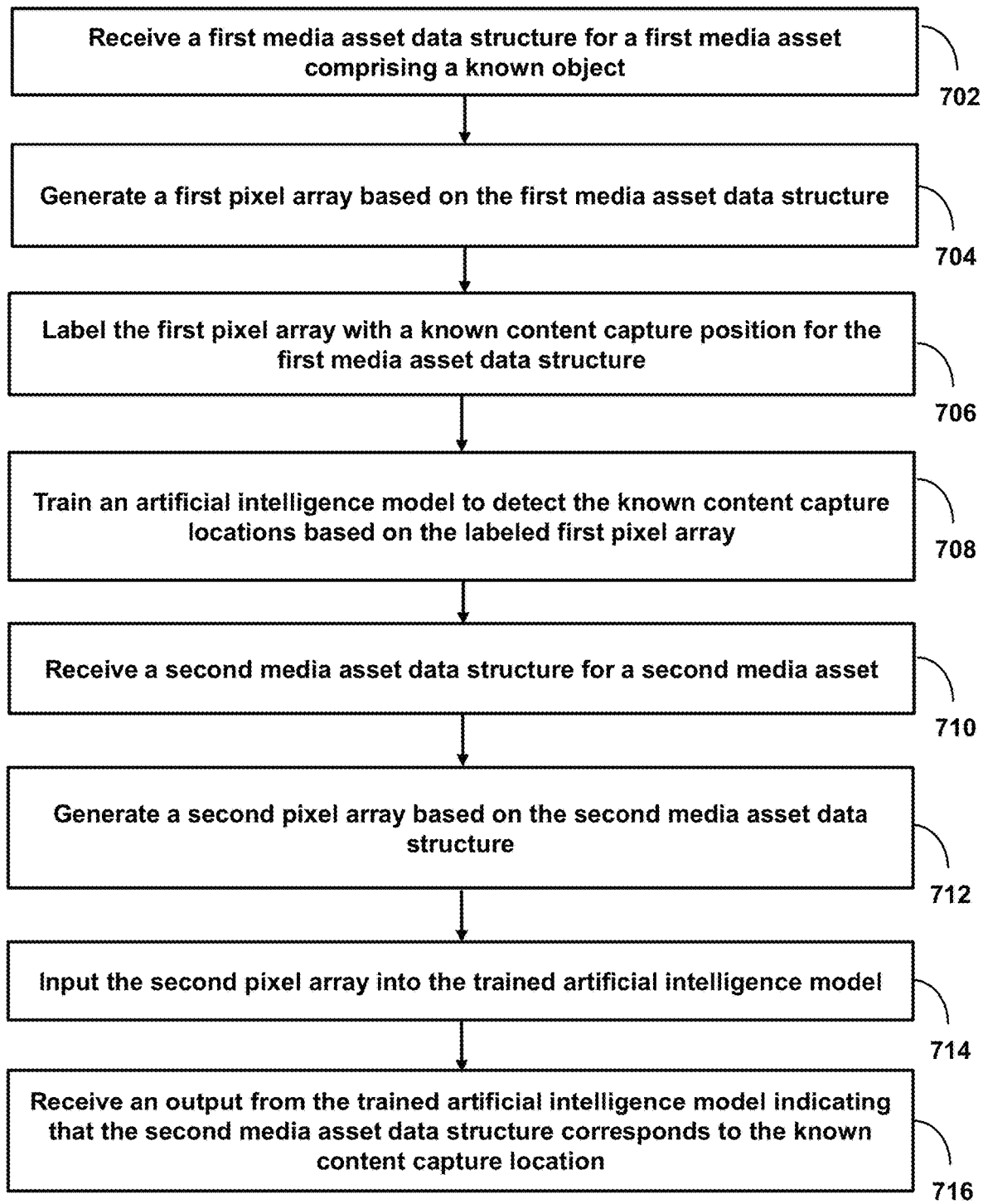
FIG. 7 shows a flowchart for training and identifying objects to generate composite media assets, in accordance with one or more embodiments.

FIG. 7 shows a flowchart for training and identifying objects to generate composite media assets, in accordance with one or more embodiments. Process 700 may be performed using the control circuitry of one or more components described in FIG. 3.

At step 702, process 700 receives (e.g., using the control circuitry of one or more components described in FIG. 3) a media asset data structure for an area. For example, the system may receive a first media asset data structure for a first media asset comprising a known object.

At step 704, process 700 generates (e.g., using the control circuitry of one or more components described in FIG. 3) a first pixel array based on the first media asset data structure. For example, in some embodiments, the system may generate pixel arrays to represent images (e.g., frames) in a media asset. The pixel array may refer to computer data that describes the image (e.g., pixel by pixel). In some embodiments, this may include one or more vectors, arrays, and/or matrices that represent either a Red, Green, Blue colored or grayscale images. Furthermore, in some embodiments, the system may additionally convert the image set from a set of one or more vectors, arrays, and/or matrices to another set of one or more vectors, arrays, and/or matrices. For example, the system may convert an image set having a red color array, a green color array, and a blue color to a grayscale color array.

At step 706, process 700 labels (e.g., using the control circuitry of one or more components described in FIG. 3) the first pixel array with a known content capture position for the first media asset data structure. For example, in order to train the artificial neural network, the system may collect and label numerous objects that may be found at various locations.

At step 708, process 700 trains (e.g., using the control circuitry of one or more components described in FIG. 3) an artificial intelligence model to detect the known content capture locations based on the labeled first pixel array. For example, as discussed in relation to FIG. 4, the artificial neural network may have classifications for different objects.

At step 710, process 700 receives (e.g., using the control circuitry of one or more components described in FIG. 3) a second media asset data structure for a second media asset. For example, the system may capture a media asset at a location.

At step 712, process 700 generates (e.g., using the control circuitry of one or more components described in FIG. 3) a second pixel array based on the second media asset data structure. In some embodiments, this may include one or more vectors, arrays, and/or matrices that represent either a Red, Green, Blue colored or grayscale images. Furthermore, in some embodiments, the system may additionally convert the image set from a set of one or more vectors, arrays, and/or matrices to another set of one or more vectors, arrays, and/or matrices. For example, the system may convert an image set having a red color array, a green color array, and a blue color to a grayscale color array.

At step 714, process 700 inputs (e.g., using the control circuitry of one or more components described in FIG. 3) the second pixel array into the trained neural network. For example, the trained neural network may identify the object and/or information about the object (e.g., as described in FIG. 5) based on the second pixel array.

At step 716, process 700 receives (e.g., using the control circuitry of one or more components described in FIG. 3) an output from the trained artificial intelligence model indicating that the second media asset data structure corresponds to the known content capture location. For example, the trained neural network may output the identification of the object and/or information about the object (e.g., size, shape, position, etc.).

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed above could be used to perform one or more of the steps in FIG. 7.

The present techniques will be better understood with reference to the following enumerated embodiments:

1. A method for coordinating uncoordinated content based on multi-modal metadata through data filtration and synchronization, the method comprising: receiving a first user input requesting a composite media asset based on a center-of-mass point for a shared geographic location at a shared time window; determining a shared object orientation based on the center-of-mass point for the shared geographic location; retrieving a first media asset data structure for a first media asset, wherein the first media asset data structure comprises first location information, first time information, and first object information; retrieving a second media asset data structure for a second media asset, wherein the second media asset data structure comprises second location information, second time information, and second object information; determining that the first media asset and the second media asset correspond to the shared geographic location based on analyzing the first location information and the second location information; in response to determining that the first media asset and the second media asset correspond to the shared geographic location, determining that the first media asset and the second media asset correspond to the shared time window based on analyzing the first time information and the second time information; in response to determining that the first media asset and the second media asset correspond to the shared time window, determining that the first media asset and the second media asset correspond to the shared object orientation based on analyzing the first object information and the second object information; and in response to determining that the first media asset and the second media asset correspond to the shared object orientation, generating the composite media asset based on the first media asset and the second media asset by merging the first media asset and the second media asset about the center-of-mass point.

2. The method of any one of the preceding embodiments, wherein the method coordinates uncoordinated content based on multi-modal metadata through data filtration and synchronization.

3. The method of any one of the preceding embodiments, wherein determining that the first media asset and the second media asset correspond to the shared geographic location based on analyzing the first location information and the second location information further comprises: receiving a second user input indicating the shared geographic location; and in response to receiving the second user input indicating the shared geographic location, filtering a plurality of available media assets based on a comparison of respective location information for the plurality of available media assets and the shared geographic location to generate a first subset of media assets.

4. The method of any one of the preceding embodiments, wherein determining that the first media asset and the second media asset correspond to the shared time window based on analyzing the first time information and the second time information further comprises: receiving a third user input indicating the shared time window; and in response to receiving the third user input indicating the shared time window, filtering first subset of media assets based on a comparison of respective time information for the first subset of media assets and the shared time window to generate a second subset of media assets.

5. The method of any one of the preceding embodiments, wherein determining that the first media asset and the second media asset correspond to the shared object orientation based on analyzing the first object information and the second object information further comprises: identifying a known object corresponding to the center-of-mass point; retrieving a plurality of known object details for the known object at the shared object orientation; and determining a known object detail of the plurality of known object details is in both the first media asset and the second media asset.

6. The method of any one of the preceding embodiments, wherein generating the composite media asset based on the first media asset and the second media asset by merging the first media asset and the second media asset further comprises: identifying a shared object in both the first media asset and the second media asset; generating a representation of the shared object in the composite media asset using a first object detail from the first media asset and a second object detail from the second media asset, wherein the second media asset does not comprise the first object detail and the first media asset does not comprise the second object detail.

7. The method of any one of the preceding embodiments, wherein: the first location information indicates a first geographic location corresponding to the first media asset; the first time information indicates a first time corresponding to the first media asset; and the first object information indicates a first object included with the first media asset.

8. The method of any one of the preceding embodiments, wherein the first media asset comprises a plurality of frames, and wherein retrieving the first media asset data structure for the first media asset further comprises: determining a first frame of the plurality of frames for generating the composite media asset; determining a subset of the first media asset data structure that corresponds to the first frame; and retrieving the location information, the first time information, and the first object information from the subset of the first media asset data structure.

9. The method of any one of the preceding embodiments, wherein the shared object orientation comprises a direction that a content capture device faced when capturing a respective media asset.

10. The method of any one of the preceding embodiments, wherein generating the composite media asset based on the first media asset and the second media asset by merging the first media asset and the second media asset about the center-of-mass point further comprises: identifying a first portion of the first media asset corresponding to an out-of-focus object; selecting a second portion of the second media asset corresponding to the out-of-focus object in the first media asset; and replacing the first portion of the first media asset with the second portion.

11. The method of any one of the preceding embodiments, wherein receiving the first user input requesting the composite media asset based on the center-of-mass point for the shared geographic location at the shared time window comprises: receiving a user selection of an object in the first media asset; determining a geographic location in which the object is found; assigning the geographic location as the shared geographic location; and assigning a position of the object at the geographic location as the center-of-mass point.

12. A tangible, non-transitory, machine-readable medium storing instructions that, when executed by a data processing apparatus, cause the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

14. A system comprising means for performing one or more of the steps of embodiments 1-11.

What is claimed is:

1. A system for generating interactive composite media assets comprising common objects by coordinating uncoordinated content using best-fit models applied to perimeters about the common objects, the system comprising:
one or more processors; and
one or more non-transitory, computer-readable mediums comprising instructions that when executed by the one or more processors causes operations comprising:
receiving source content comprising uncoordinated media assets generating using a plurality of digital cameras;
receiving a first user input requesting a composite media asset based on a center-of-mass point for a shared geographic location at a shared time window;
in response to the first user input, performing a data filtration process by:
determining a shared object orientation based on the center-of-mass point for the shared geographic location, wherein the shared object orientation comprises a direction that a digital camera of the plurality of digital cameras faced when capturing a respective media asset from locations, as determined by applying a best-fit mechanism to the center-of-mass point, on a near-continuous perimeter about the center-of-mass point;
retrieving respective media asset data structures for two media assets, wherein the respective media asset data structures comprise a geographic location corresponding to the two media assets, a time corresponding to the two media assets, and an object included with the two media assets;
determining that the two media assets correspond to the geographic location and time;
in response to determining that the two media assets correspond to the geographic location and time, determining that the two media assets correspond to the shared object orientation based on (i) analyzing the object and (ii) determining that the two media assets correspond to one or more of the locations on the near-continuous perimeter about the center-of-mass point; and
in response to determining that the two media assets correspond to the shared object orientation, synchronizing the two media assets by generating the composite media asset.

2. A method for generating interactive composite media assets comprising common objects by coordinating uncoordinated content using best-fit models applied to perimeters about the common objects, the method comprising:
receiving a first user input requesting a composite media asset based on a center-of-mass point for a shared geographic location at a shared time window;
determining a shared object orientation based on the center-of-mass point for the shared geographic location, wherein the shared object orientation comprises a direction that a content capture device faced when capturing a respective media asset and locations on a near-continuous perimeter about the center-of-mass point;
retrieving a first media asset data structure for a first media asset, wherein the first media asset data structure comprises first location information, first time information, and first object information;
retrieving a second media asset data structure for a second media asset, wherein the second media asset data structure comprises second location information, second time information, and second object information;
determining that the first media asset and the second media asset correspond to the shared geographic location based on analyzing the first location information and the second location information;
in response to determining that the first media asset and the second media asset correspond to the shared geographic location, determining that the first media asset and the second media asset correspond to the shared time window based on analyzing the first time information and the second time information;
in response to determining that the first media asset and the second media asset correspond to the shared time window, determining that the first media asset and the second media asset correspond to the shared object orientation based on (i) analyzing the first object information and the second object information and (ii) determining that the first media asset and the second media asset correspond to one or more of the locations on the near-continuous perimeter about the center-of-mass point;
in response to determining that the first media asset and the second media asset correspond to the shared object orientation, generating the composite media asset, in a user interface, based on the first media asset and the second media asset, by merging the first media asset and the second media asset about the center-of-mass point;

receiving, via the user interface, a second user input requesting a movement within the shared geographic location; and in response to the second user input, determining a new center-of-mass point for the composite media asset.

3. The method of claim 2, wherein the locations on the near-continuous perimeter about the center-of-mass point are determined by filtering media assets to determine a smallest contained shape about the center-of-mass point.

4. The method of claim 2, wherein the locations on the near-continuous perimeter about the center-of-mass point are determined by applying a best-fit mechanism to the center-of-mass point.

5. The method of claim 2, wherein merging the first media asset and the second media asset about the center-of-mass point further comprises:

detecting an object detail in the first media asset; and
rotating the first media asset based on the object detail.

6. The method of claim 2, wherein merging the first media asset and the second media asset about the center-of-mass point further comprises:

detecting a first object in the first media asset, wherein the first object has a first scale;
detecting a second object in the second media asset, wherein the second object has a second scale; and
using scale spaced merging to merge the first object and the second object.

7. The method of claim 2, wherein merging the first media asset and the second media asset about the center-of-mass point further comprises:

determining a number of objects in the first media asset and the second media asset to be blurred; and
determining a level of blur based on the number of objects.

8. The method of claim 2, further comprising:

generating for display, in the user interface, a mapping of available media assets for the composite media asset; and
generating for display, in the user interface, an indicator of the available media assets based on the first location information and the second location information.

9. The method of claim 2, wherein determining that the first media asset and the second media asset correspond to the shared geographic location further comprises:

receiving a third user input indicating the shared geographic location; and
in response to receiving the third user input indicating the shared geographic location, filtering a plurality of available media assets based on a comparison of respective location information for the plurality of available media assets and the shared geographic location to generate a first subset of media assets.

10. The method of claim 9, wherein determining that the first media asset and the second media asset correspond to the shared time window further comprises:

receiving a fourth user input indicating the shared time window; and
in response to receiving the fourth user input indicating the shared time window, filtering the first subset of media assets based on a comparison of respective time information for the first subset of media assets and the shared time window to generate a second subset of media assets.

11. The method of claim 2, wherein determining that the first media asset and the second media asset correspond to the shared object orientation further comprises:

identifying a known object corresponding to the center-of-mass point;
retrieving a plurality of known object details for the known object at the shared object orientation; and
determining a known object detail of the plurality of known object details is in both the first media asset and the second media asset.

12. The method of claim 2, wherein generating the composite media asset based on the first media asset and the second media asset by merging the first media asset and the second media asset further comprises:

identifying a shared object in both the first media asset and the second media asset; and
generating a representation of the shared object in the composite media asset using a first object detail from the first media asset and a second object detail from the second media asset,
wherein the second media asset does not comprise the first object detail and the first media asset does not comprise the second object detail.

13. The method of claim 2, wherein:

the first location information indicates a first geographic location corresponding to the first media asset;
the first time information indicates a first time corresponding to the first media asset; and
the first object information indicates a first object included with the first media asset.

14. The method of claim 2, wherein the first media asset comprises a plurality of frames, and wherein retrieving the first media asset data structure for the first media asset further comprises:

determining a first frame of the plurality of frames for generating the composite media asset;
determining a subset of the first media asset data structure that corresponds to the first frame; and
retrieving the first location information, the first time information, and the first object information from the subset of the first media asset data structure.

15. The method of claim 2, wherein generating the composite media asset based on the first media asset and the second media asset further comprises:

identifying a first portion of the first media asset corresponding to an out-of-focus object; selecting a second portion of the second media asset corresponding to the out-of-focus object in the first media asset; and
replacing the first portion of the first media asset with the second portion.

16. The method of claim 2, wherein receiving the first user input requesting the composite media asset based on the center-of-mass point for the shared geographic location at the shared time window comprises:

receiving a user selection of an object in the first media asset;
determining a geographic location in which the object is found;
assigning the geographic location as the shared geographic location; and
assigning a position of the object at the geographic location as the center-of-mass point.

17. A non-transitory, computer-readable medium comprising instructions that when executed by one or more processors cause operations comprising:

receiving a first user input requesting a composite media asset based on a center-of-mass point for a shared geographic location at a shared time window;
determining a shared object orientation based on the center-of-mass point for the shared geographic location, wherein the shared object orientation comprises a direction that a content capture device faced when capturing a respective media asset and locations, determined by filtering media assets to determine a smallest contained shape about the center-of-mass point, on a near-continuous perimeter about the center-of-mass point;

retrieving a first media asset data structure for a first media asset, wherein the first media asset data structure comprises first location information, first time information, and first object information;

retrieving a second media asset data structure for a second media asset, wherein the second media asset data structure comprises second location information, second time information, and second object information;

determining that the first media asset and the second media asset correspond based on comparing the first media asset data structure to the second media asset data structure;

in response to determining that the first media asset and the second media asset correspond, determining that the first media asset and the second media asset correspond to the shared object orientation based on (i) analyzing the first object information and the second object information and (ii) determining that the first media asset and the second media asset correspond to one or more of the locations on the near-continuous perimeter about the center-of-mass point; and in response to determining that the first media asset and the second media asset correspond to the shared object orientation, generating the composite media asset based on the first media asset and the second media asset by merging the first media asset and the second media asset about the center-of-mass point, wherein the composite media asset comprises a portion of a 360 degree media asset from the locations on the near-continuous perimeter about the center-of-mass point.

18. The non-transitory, computer-readable medium of claim 17, wherein determining that the first media asset and the second media asset correspond to the shared geographic location further comprises:

receiving a second user input indicating the shared geographic location; and in response to receiving the second user input indicating the shared geographic location, filtering a plurality of available media assets based on a comparison of respective location information for the plurality of available media assets and the shared geographic location to generate a first subset of media assets.

19. The non-transitory, computer-readable medium of claim 18, wherein determining that the first media asset and the second media asset correspond to the shared time window further comprises:

receiving a third user input indicating the shared time window; and in response to receiving the third user input indicating the shared time window, filtering first subset of media assets based on a comparison of respective time information for the first subset of media assets and the shared time window to generate a second subset of media assets.

20. The non-transitory, computer-readable medium of claim 17, wherein determining that the first media asset and the second media asset correspond to the shared object orientation further comprises:

identifying a known object corresponding to the center-of-mass point;

retrieving a plurality of known object details for the known object at the shared object orientation; and determining a known object detail of the plurality of known object details is in both the first media asset and the second media asset.

* * * * *